United States Patent [19]

Amberg et al.

[11] 4,412,291
[45] Oct. 25, 1983

[54] BRAKE TORQUE CONTROL SYSTEM

[75] Inventors: Robert L. Amberg; Thomas J. Gaseor, both of Seattle, Wash.

[73] Assignee: The Boeing Company, Seattle, Wash.

[21] Appl. No.: 192,248

[22] Filed: Sep. 30, 1980

[51] Int. Cl.³ .................. B60T 8/00; G06G 7/70
[52] U.S. Cl. .................. 364/426; 188/181 T; 303/112; 318/610; 364/162
[58] Field of Search .......... 364/162, 426; 303/112; 188/181 T; 244/111; 318/610, 611

[56] References Cited

U.S. PATENT DOCUMENTS

| | | | |
|---|---|---|---|
| 3,008,548 | 11/1961 | Moyer | 303/112 |
| 3,533,236 | 10/1970 | Cottington | 318/610 |
| 3,614,174 | 10/1971 | Romero | 303/97 |
| 3,689,120 | 9/1972 | Sumiyoshi et al. | 188/181 T |
| 3,741,474 | 6/1973 | Kawada et al. | 318/610 |
| 3,743,361 | 7/1973 | Vieth, Jr. | 188/181 T |
| 3,923,345 | 12/1975 | Poggie | 188/181 T |
| 3,948,569 | 4/1976 | Gentet et al. | 244/111 |
| 4,043,607 | 8/1977 | Signorelli et al. | 303/112 |
| 4,129,202 | 12/1978 | Winters et al. | 188/181 T |
| 4,236,202 | 11/1980 | Giles et al. | 364/162 |

*Primary Examiner*—Jerry Smith
*Attorney, Agent, or Firm*—Christensen, O'Connor, Johnson & Kindness

[57] ABSTRACT

An airplane braking system includes a torque control circuit for control torque developed in a braked landing wheel. The torque control circuit is responsive to a torque signal from a transducer located in the torque equalizing links of the landing gear assembly. The torque signal is compared with a reference signal and passed through an integrator, a differentiator and proportional gain amplifier in the torque control circuit to provide a torque control signal. The torque control signal is applied to a brake pressure relief valve to reduce brake pressure. The torque control circuit is advantageously integrated with an antiskid circuit responsive to wheel speed to thereby preventskidding as well as excessive torque conditions. In the preferred embodiment, the output of the antiskid circuit is combined with the output of the integratorof the torque control circuit in a feedback loop such that the torque control circuit tracks are antiskid circuit output in the event of a skid to thereby prevent torque overshoot when the airplane comes out of the skid.

15 Claims, 5 Drawing Figures

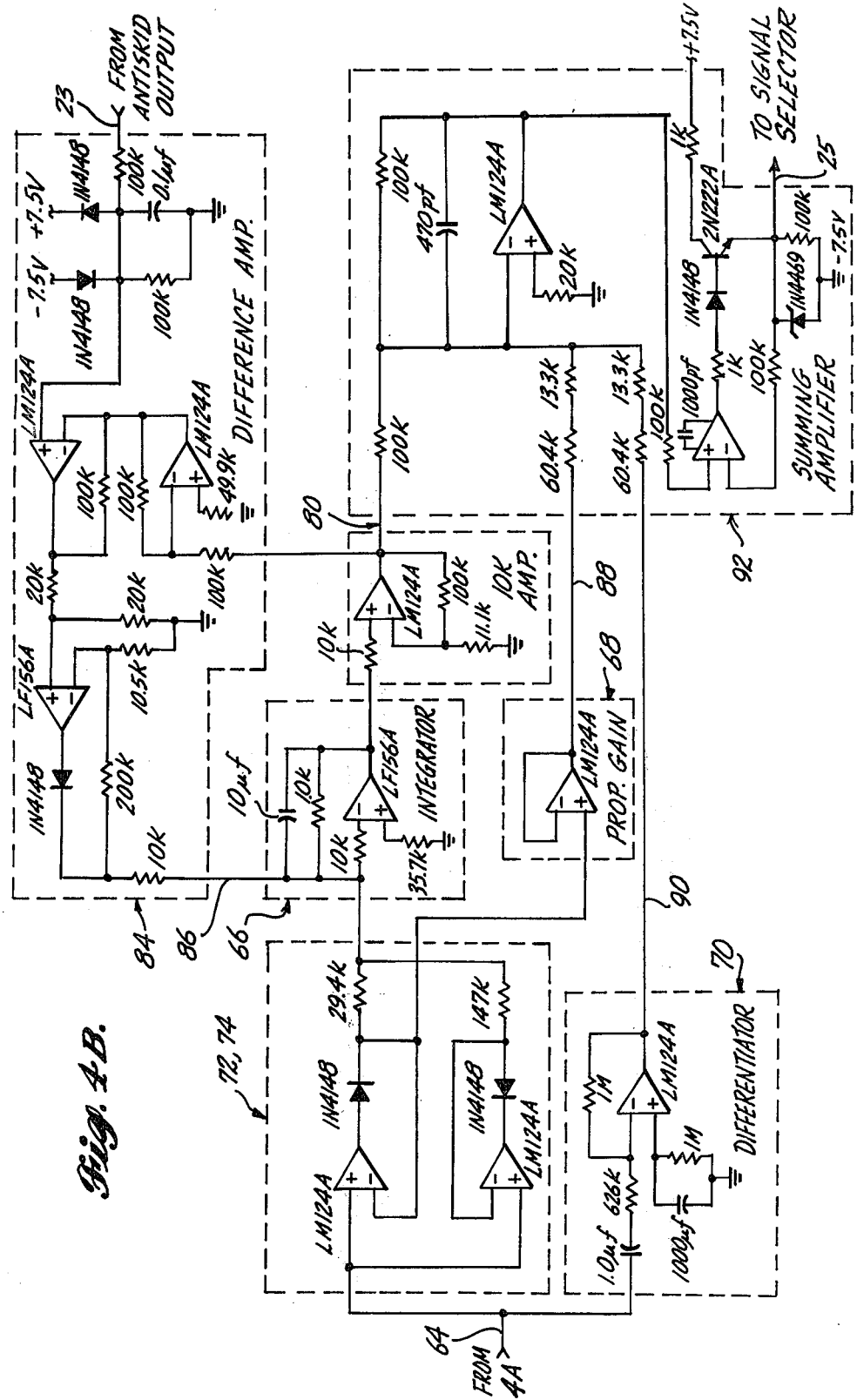

BRAKE TORQUE CONTROL SYSTEM

BACKGROUND OF THE INVENTION

This invention generally relates to brake control systems for wheeled vehicles and, more particularly, to brake torque control systems for limiting torque developed during braking of a wheeled vehicle, particularly commercial airplanes.

Brake systems of large commercial transport airplanes include pilot-operated brake controls coupled to hydraulically actuated brakes in the main landing wheels of the airplane. In simple outline, the pilot's brake pedals are coupled to a pressure metering valve that admits hydraulic fluid to the brakes at a pressure which varies in response to the manual braking force exerted by the pilot. Such airplanes typically further include an automatic braking system which, when armed by the pilot during a landing approach, automatically applies the brakes in a predetermined manner on touchdown so as to free the pilot to attend to other matters during landing of the airplane.

In addition to the basic elements described above, the braking system of a large commercial airplane typically includes an antiskid system that operates to automatically prevent skidding of the tires overriding the pilot's manual braking commands where necessary to prevent skidding. Antiskid systems are important since uncontrolled skidding of a large commercial airplane can result in wearing through of the landing wheel tires within a few seconds and may also result in loss of control over the airplane.

Such antiskid systems typically include a brake pressure relief valve, sometimes called an antiskid valve, interposed in the hydraulic pressure line of each brake. When the antiskid system senses a skid condition, an antiskid control signal causes the antiskid valve to open quickly and reduce brake pressure, thereby correcting the skid condition.

The antiskid system typically detects a skid condition by measuring the angular deceleration of the landing wheels. More specifically, a wheel speed transducer associated with each wheel provides a wheel speed signal, the time derivative of which provides a signal indicative of wheel deceleration. The antiskid system is responsive to the wheel deceleration signal to actuate the antiskid valve whenever the wheel deceleration signal exceeds a predetermined value. Examples of antiskid systems are disclosed in U.S. Pat. No. 4,078,845 to Amberg et al. and in U.S. Pat. No. 4,180,223 to Amberg, the contents of which are hereby incorporated by reference.

The present invention is addressed to a problem not adequately solved by conventional braking systems, including systems having antiskid capabilities as described above. Specifically, certain large commercial airplanes are being retrofitted with carbon brakes to replace steel brakes originally installed on the airplane. The steel brakes and the carbon brakes are similar in structure and generally include multiple interleaved stator and rotor brake discs. The rotor discs are affixed to and rotate with the landing wheel. The stator discs are nonrotating and are affixed to a stationary brake housing and axle assembly. A hydraulic actuator mechanism drives the stacked rotor and stator discs together to provide braking action. In the carbon brakes the stator and rotor discs are formed of a carbon-based material that can withstand higher braking temperatures than can steel brakes.

One advantage in switching to carbon brakes is a net reduction in airplane weight of as much as 1600 pounds. This reduction in weight is achieved with no penalty in brake performance. Additionally, as stated above, the ability of the carbon brakes to withstand higher braking temperatures renders them capable of absorbing larger amounts of heat generated by friction during braking. As a result, the carbon brakes can be applied longer and harder than steel brakes under the same conditions.

Carbon brakes, like steel brakes, exhibit a coefficient of friction that varies as a function of wheel speed, temperature, age, moisture and other factors. It is found, however, that carbon brakes exhibit a considerably greater range of variation in their coefficients of friction than do steel brakes. As a result, the coefficient of friction of the carbon brakes exceeds under certain circumstances the maximum coefficient of friction previously obtained with steel brakes. Accordingly, the brake torque obtained by application of carbon brakes with a particular hydraulic brake pressure is at times considerably greater than the maximum brake torque previously obtained with steel brakes. This poses certain structural load problems nonexistent with steel brakes, as discussed further below.

The brake torque developed at a landing wheel is transmitted through a torque equalizing assembly so as to be fully borne as a rearward translational load by the landing gear strut assembly. The landing gear was originally designed to accommodate the loads encountered with steel brakes, which, as stated above, fall within a narrower range than the loads experienced with carbon brakes. It has been found that under certain conditions, for example with a fully loaded airplane landing on a dry runway, the brake torque developed with carbon brakes may be sufficiently greater than that previously obtained with steel brakes as to result in stresses on the landing gear strut assembly which exceed the design load limits of the landing gear. With steel brakes, such high torque was never developed and the load limits of the strut assembly were therefore never exceeded. With the installation of the new carbon brakes, however, it becomes necessary to ensure that the brakes are not applied so as to exceed the load limits of the strut assembly. The antiskid system alone cannot provide this protection, since it is responsive to wheel speed rather than brake torque. Similarly, simply limiting the brake pressure is not adequate to prevent excessive torque because brake torque varies in a rather complex and not altogether predictable manner in response to varying brake pressure, and is additionally dependent on other factors such as the presence of water in the brakes.

Accordingly, it is the primary object and purpose of the present invention to provide a braking system that includes a brake torque control system which operates to limit the torque developed at a braked wheel of a vehicle. Although the present invention solves the particular problem described above with respect to the change to carbon brakes in commercial airplane landing wheel assemblies, it will be recognized that the invention may be of general applicability to other applications where it is desirable to limit the torque developed at a braked wheel.

It is also an object and purpose of the present invention to provide a simple and reliable brake torque control system that is compatible with and retrofittable onto a preexisting airplane braking system having an antiskid system as described above. In this regard, it is an object to provide an airplane braking system which includes both skid control and torque control systems which operate independently and in parallel to prevent skidding as well as excessive torque conditions at all times.

In the development of a torque control system to solve the landing gear load problem described above, it has been sought to provide a system which can be integrated with existing antiskid systems. Particularly, it has been sought to provide a system which prevents torque overshoot when, for example, an airplane comes out of a skid on ice and the torque rises rapidly as the braked wheels contact dry pavement. Under such conditions it is desirable to have the torque control system track the output of the antiskid system so as to anticipate and compensate for the sudden rise in torque that ordinarily results when the airplane comes out of a skid under the control of the antiskid system. Accordingly, it is another object to provide a torque control system which acts independently of the antiskid system to limit torque, and which yet also tracks the antiskid output to prevent torque overshoot as the airplane comes out of a skid.

To obtain optimum braking performance, it is desirable that the brakes be fully operable up to the load limits of the landing gear and yet also be fully responsive to the pilot's commands over this range. Previously known or readily apparent methods for limiting brake torque by conventional feedback control based on brake torque measurement are not satisfactory. Specifically, there has not been available previously a torque control system that is sufficiently responsive to rapid brake pressure application to prevent torque overshoot (development of torque greater than a predetermined maximum level) and which also provides a stable, damped control signal only within a narrow torque range at or near the load limit of the landing gear. Typically, prevention of torque overshoot has been obtained at the expense of diminished brake response sensitivity or at the expense of operating the system well below the actual torque limit so as to provide a safe margin of overshoot error.

For example, an airplane braking system having both antiskid and torque limiting systems is disclosed in U.S. Pat. No. 4,043,607 to Signorelli et al. The system of Signorelli et al. includes a torque limiting device for the purpose of preventing damage to the brakes from high torque conditions. In the system of Signorelli et al., a torque transducer provides a signal representative of measured brake torque to a servocontrol device which compares the measured torque signal with a reference signal. The value of the reference signal varies in response to the pilot's displacement of the brake pedal controls. Referring to the disclosure of Signorelli et al., and particularly FIG. 4 for example, actuation of the brakes is under the direct control of the pilot at torque levels less than a predetermined value and under feedback control of a servocontrol device 30 at torque levels above such predetermined value. More particularly, at low torque levels, signals representing the pilot's braking commands pass through a direct actuation device 32. When the torque exceeds the predetermined level, the pilot's command signals pass through the servocontrol devic 30 which regulates application of the brakes.

The direct actuation device 32 of Signorelli et al. includes a means for automatically limiting the rate of increase of brake pressure to a predetermined maximum rate. This prevents torque overshoot that might otherwise result from a sudden application of the brakes, but limits somewhat the responsiveness of the brakes to the pilot's manual controls. At higher torque levels, torque overshoot is prevented while braking is under the control of the servocontrol device 30 by regulating the application of brake pressure in response to a feedback signal representing actual measured torque such that the actual torque obtained is represented by predetermined torque functions, or laws, A and B, which are illustrated in FIG. 7 of Signorelli et al. The actual selection of law A or law B is made automatically by the servocontrol device 30 on the basis of the aircraft ground speed. Predetermined threshold, or maximum, values of the torque, indicated as Cca and Ccb in FIG. 7, limit the maximum brake pressure that may be applied under servocontrol. It will be apparent to one of ordinary skill, therefore, that torque overshoot is prevented in the system of Signorelli et al. by automatically limiting the rate of increase of brake pressure to a predetermined ramp function when braking is under the direct control of the pilot via the direct actuation device 32, and is prevented while braking is under the control of the servocontrol device 30 by reason of the feedback controlled application of the brakes. Thus, in both cases, torque overshoot is prevented to some extent by limiting the responsiveness of the braking system to the pilot's commands. It is, therefore, another object of the present invention to provide an improved torque control system that effectively operates to prevent substantial torque overshoot beyond a predetermined maximum torque without also limiting the rate of increase of brake pressure obtainable by direct command of the pilot.

SUMMARY OF THE INVENTION

In accordance with the present invention, a hydraulic braking system for a braked wheel includes a brake torque control system. The brake torque control system is coupled to a brake pressure relief valve which operates in response to a torque control signal from the brake torque control system to relieve brake pressure and thereby reduce brake torque.

The brake torque control system includes a brake torque transducer installed in a torque equalizing assembly of the braked wheel. The torque transducer produces an electrical signal representative of the actual torque developed during application of the brakes. This actual brake torque signal is compared with an independently generated reference torque signal which corresponds in magnitude to a predetermined maximum torque. Comparison of the actual torque signal with the reference signal provides an error signal indicative of the difference between the actual torque and the maximum torque.

The error signal is applied as an input to a torque limiting circuit containing a proportional gain amplifier, a differentiator and an integrator. The outputs of these elements of the circuit are combined in a summing amplifier to provide the torque control signal. The torque control signal is applied to the brake pressure relief valve of the braking system to reduce brake pressure as required.

In the preferred embodiment, the brake torque control system is employed in a braking system also having an antiskid system. In this case, the output signal from the torque limiting circuit is provided as one input to a signal selector. The output of the antiskid system is provided as a second input to the signal selector. The signal selector transmits the higher of the torque and antiskid control signals to the brake pressure relief valve, i.e., the signal selector performs an either/or function which selects the larger of the two input signals, rather than summing the signals, to actuate the pressure relief valve. The result of selecting the larger of the two signals is to obtain the minimum reduction in brake pressure necessary to prevent skidding and also limit the brake torque to less than the prescribed maximum, thereby avoiding over compensation as would be obtained if the control signals were combined.

In another aspect of the invention, the output of the antiskid system is provided as an input to the integrator of the torque limiting circuit such that the integrator effectively tracks the antiskid output during a skid. That is, the integrator integrates the brake torque error signal down to the antiskid voltage level and tracks the antiskid signal during periods when the brakes are under the control of the antiskid system. With this circuit, the brake torque control system does not experience a step change and accompanying torque overshoot when the wheels come out of a skid. Rather, as the wheels come out of a skid and the brakes are rapidly applied once again, the output of the brake torque control system is maintained at a high level so as to adequately limit the rapidly rising torque and regulate the applied brake pressure as required when the torque limit is reached.

In another aspect of the invention, the proportional gain amplifier of the torque limiting circuit has a negative gain constant whereas the integrator and differentiator have positive gains. It is found that, for typical commercial transport landing gear assemblies, positive or zero proportional gain constants shift the root loci of the system toward unstable damping conditions, whereas negative proportional gain constants shift the root loci of the system toward increasingly stable damping conditions.

BRIEF DESCRIPTION OF THE DRAWINGS

FIGS. 4A and 4B set forth a schematic circuit diagram of the brake torque control circuit.

DETAILED DESCRIPTION OF THE PREFERRED EMBODIMENT

Figure 1:
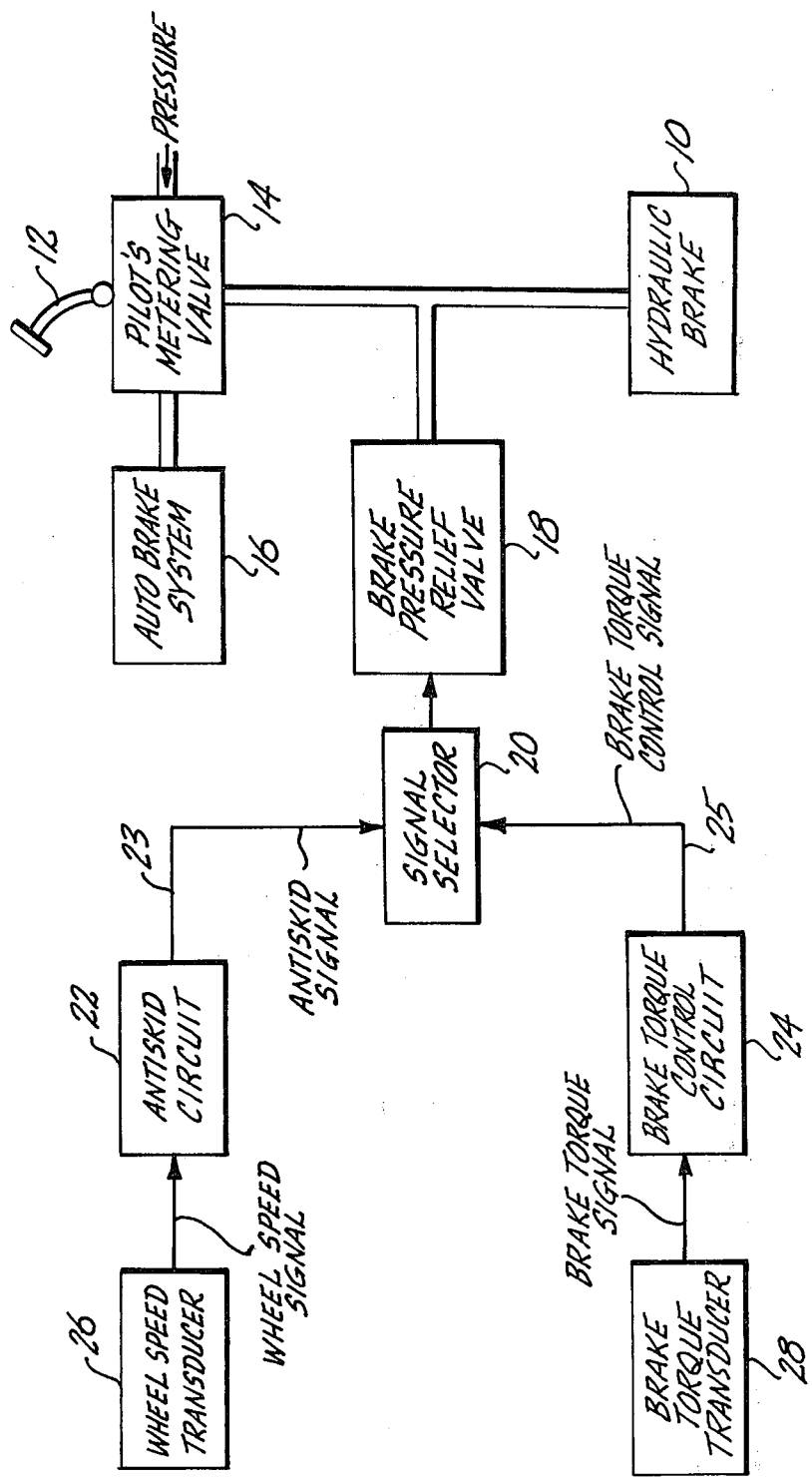
FIG. 1 is a functional block diagram of a preferred embodiment of an airplane braking system including the brake torque control system of the present invention.

FIG. 1 illustrates in simplified functional block diagram the preferred embodiment of an airplane braking system constructed in accordance with the present invention. Briefly, a hydraulic brake 10 associated with a main landing wheel is controlled by pilot-operated controls 12 operating through a pilot's pressure metering valve 14. The pilot's metering valve 14 operates in a conventional manner to meter pressurized fluid to the hydraulic brake 10 in response to the pilot's manual actuation of the controls 12. More specifically, actuation of the pilot's control 12 and the metering valve 14 operates to vary the fluid pressure applied to the hydraulic brake 10 and thereby directly varies the brake force applied by the brake 10. The actual torque developed in the braked landing wheel by application of a particular brake pressure and corresponding brake force will vary depending on such factors as the wheel speed, the type of brake, and the temperature of the brake.

The braking system also includes an automatic braking system 16 which is normally armed by the pilot during a landing approach and which automatically applies the brakes in a predetermined manner on landing, thereby freeing the pilot to attend to other matters.

A brake pressure relief valve 18 is coupled to the pressure line of each brake assembly. The brake pressure relief valve 18 operates in response to a control signal from a signal selector 20 to relieve brake pressure in the event of either a skid condition or an excessively high torque condition. In relieving brake pressure, the brake pressure relief valve 18 effectively overrides and supersedes the brake control commands from the pilot or the autobrake system 16.

It will be understood that all of the braked wheels of the airplane are equipped with substantially identical antiskid and torque limiting systems so as to be independently protected against skidding and excessive torque conditions. The present description, therefore, is addressed to the braking system for an individual braked wheel.

The signal selector 20 is connected to an antiskid circuit 22 and a brake torque control circuit 24. The antiskid circuit monitors wheel speed by means of a wheel speed transducer 26. The brake torque control circuit 24 monitors actual brake torque developed at the braked wheel by means of a brake torque transducer 28.

The antiskid circuit 22 provides an antiskid signal 23 to the signal selector 20 in response to a wheel speed signal from the wheel speed transducer 26 indicative of a skid condition. More particularly, the antiskid circuit 22 monitors the angular deceleration of the wheel to detect a skid condition. The details of the antiskid circuit 22 and the wheel speed transducer 26 are disclosed, for example, in the patent to Amberg et al. referenced above.

Similarly, the brake torque control circuit 24 provides a brake torque control signal 25 to the signal selector 20 in response to a brake torque signal from the torque transducer 28 indicative of excessively high torque conditions. The signal selector 20 performs and either/or function to transmit the larger of the antiskid signal 23 and the brake torque control signal 25 to the brake pressure relief valve 18. That is, the signal selector 20 does not perform a summing function.

Figure 2:
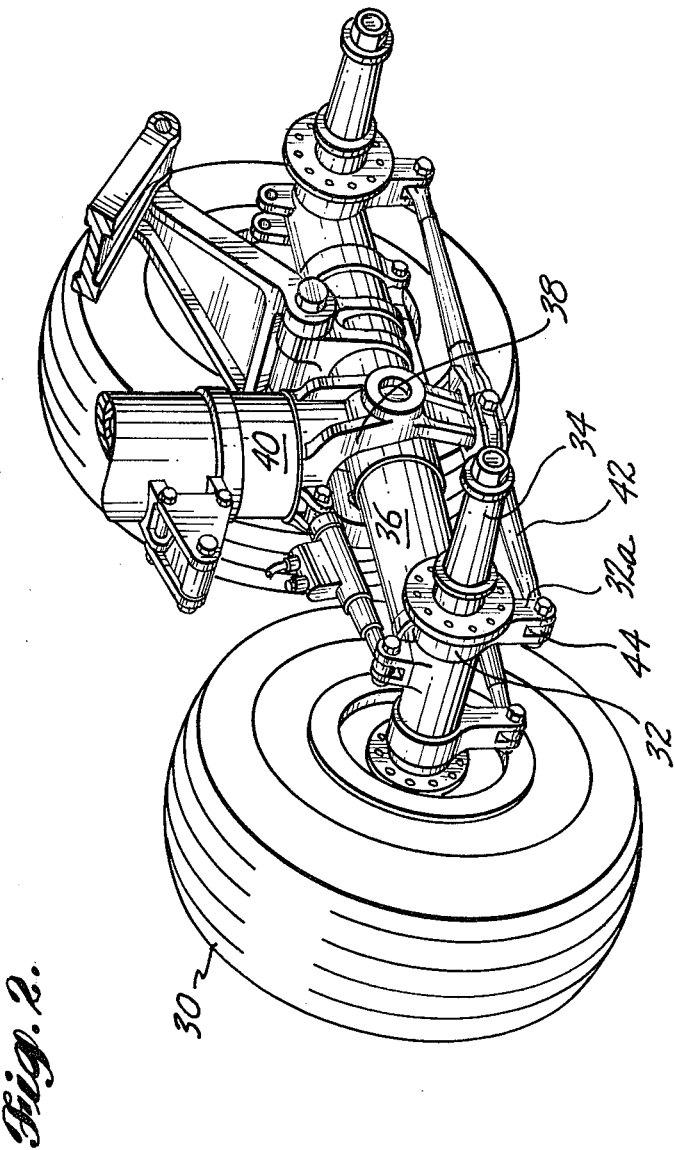
FIG. 2 is a pictorial view of a main landing gear truck assembly of a commercial transport airplane.

FIG. 2 illustrates a main landing gear truck assembly and shows the preferred position of the brake torque transducer 28. Landing wheels 30 are coupled to brake assemblies 32 which are rotatable about the stationary axles 34. The axles 34 are affixed to the ends of a truck beam 36 pivotably attached at its midsection to a yoke 38 at the lower end of an inner shock strut cylinder 40 of the landing gear assembly.

Inside each brake assembly 32 are a plurality of rotor discs (not shown) which rotate with the associated landing wheel 30. During braking, the rotor discs are engaged with a plurality of intermeshed stator discs affixed to the housing of the brake assembly 32. Torque generated by friction during braking is thus transmitted to the housing of the brake assembly 32. The housing of the brake assembly 32 is rotatable about the axle 34, but is prevented from actually rotating by an extension arm 32a and a torque equalizing rod 42. The extension arm 32a extends radially from the housing of the brake assembly 32 and is pivotably coupled to the torque equalizing rod 42 by a pivot pin 44. The equalizing rod is pivotably connected at its opposite end to an extension of the yoke 38 of the shock strut cylinder 40. Torque generated in the brake assembly 32 is thus transmitted through the torque equalizing rod 42 to the inner cylinder 40 of the landing gear assembly to thereby prevent pitching of the landing wheels during braking.

The torque transducer 28 is preferably located inside a central longitudinal bore of the pivot pin 44 connecting the equalizing rod 42 to the extension arm 32a of the brake housing. Deflection of the pivot pin 44 in response to torque generated within the brake assembly 32 results in variation of the resistance of transducer elements affixed to the inside of the longitudinal bore through the pivot pin 44. The resistance of the transducer element or elements is measured with a bridge circuit to provide an electrical signal representative of the actual torque developed in the brake.

Figure 3:
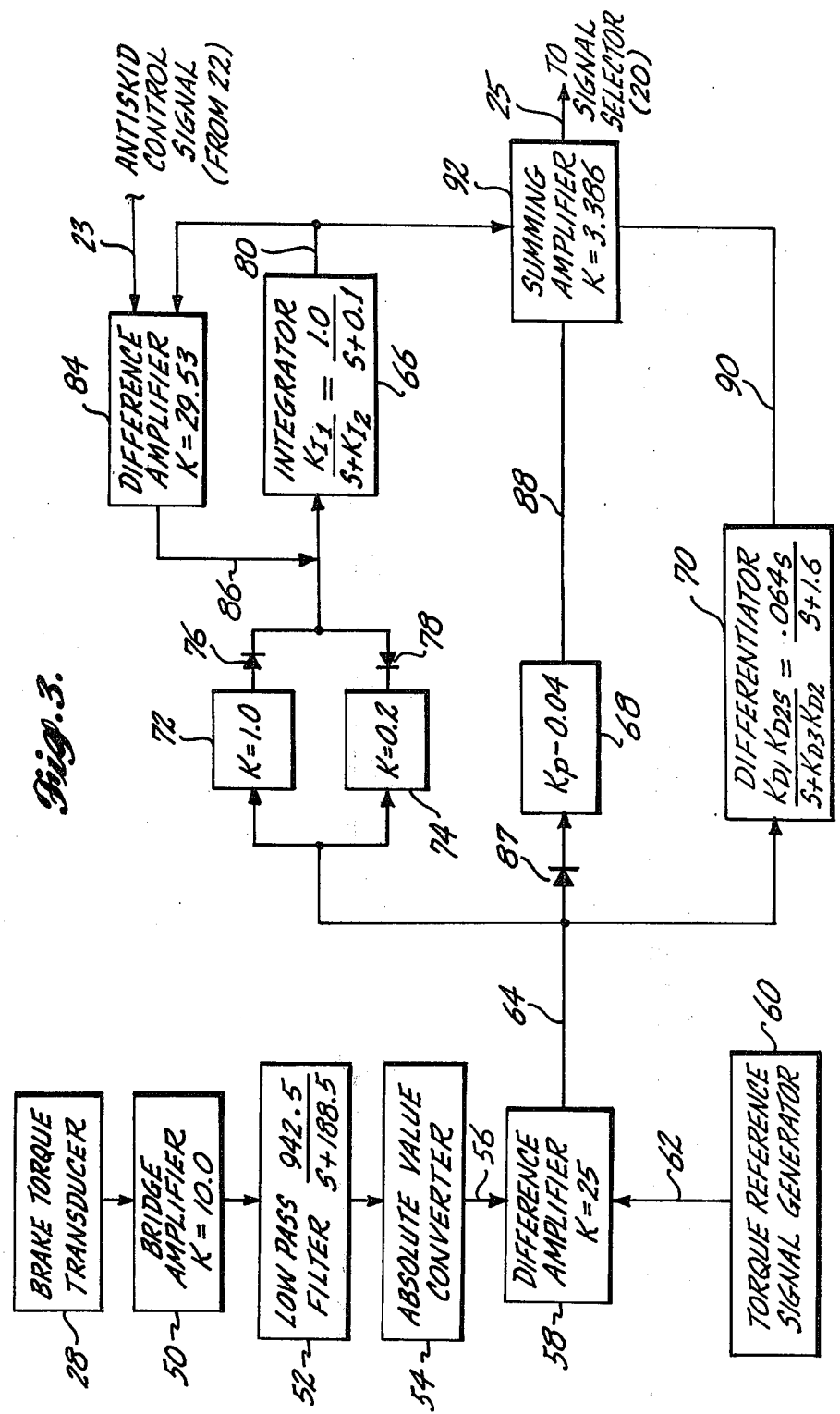
FIG. 3 is a functional block diagram of the preferred embodiment of the brake torque control circuit illustrated in FIG. 1.

FIG. 3 is a more detailed functional block diagram of the brake torque transducer 28 and the torque control circuit 24. A schematic diagram of an electrical circuit implementing the brake torque control circuit 24 is set forthe in FIGS. 4A and 4B.

Referring to FIG. 3, the brake torque transducer 28 produces a variable voltage DC signal which is passed successively through a bridge amplifier 50, a 30 Hertz low pass filter 52 to remove vibrational noise components, and an absolute value converter 54. The resulting measured torque signal 56 is a positive DC signal which is applied as one input to a difference amplifier 58.

A reference brake torque signal generator 60 generates a normally constant voltage DC reference torque signal 62. The reference torque signal 62 represents the maximum allowable torque, for example a signal of 2.7 volts representing a torque of 45,000 foot-pounds in the case of the actual preferred embodiment. The reference torque signal 62 is subtracted from the measured brake torque signal 56 in the difference amplifier 58 to produce a torque error signal 64.

The torque error signal 64 is applied as input to each of an integrator 66, a proportional gain amplifier 68, and a differentiator 70 connected in parallel.

The torque error signal 64 is applied to the integrator 66 through a pair of unidirectional amplifiers 72 and 74. More specifically, the amplifier 72 transmits only positive error signals 64 to the integrator 66, whereas the amplifier 74 transmits only negative error signals 64 to the integrator 66. The opposite polarity characteristics of the amplifiers 72 and 74 are indicated schematically by the oppositely oriented diodes 76 and 78. Preferably, the gain of the amplifier 74 is substantially smaller than the gain of the amplifier 72, for example a gain of 1.0 for amplifier 72 and 0.2 for amplifier 74. The purpose of this arrangement is to weight the error signal input to the integrator 66 in favor of positive error signals 64 which are representative of excess torque conditions. Weighting the inputs to the integrator 66 in this manner allows the output gain of the integrator 66 to be selected sufficiently high to provide a responsive signal under conditions of excessive torque and yet decay at a relatively slow rate in response to normal torque conditions.

The integrator 66 produces an integrated output signal 80 which is subtractively combined with the antiskid control signal 23 from the antiskid system 22 in a difference amplifier 84. The difference amplifier 84 produces an output signal 86 which represents the difference between the antiskid control signal 23 and the output signal 80 of the integrator 66. The output signal 86 is fed back into the integrator 66 such that the integrator 66 effectively tracks the output of the antiskid system. This causes the output of the integrator 66 to remain at a relatively high level during skidding so as to, in effect, anticipate the rapid increase in torque that ordinarily results as the airplane comes out of a skid, thus preventing torque overshoot at the end of a skid. The difference amplifier 84 is unidirectional so as to provide a feedback signal 86 to the integrator 66 only during a skid condition wherein the antiskid control signal is greater than the integrator output signal 80.

The proportional gain amplifier is responsive only to positive error signals, as indicated by diode 87. The proportional gain amplifier 68 and the differentiator 70 provide output signals 88 and 90 which are combined with the output signal 80 from the integrator 66 in a summing amplifier 92. The output of the summing amplifier 92 constitutes the brake torque control signal 25 which is applied to the signal selector 20.

The torque control signal 25, when passed through the signal selector 20, actuates the pressure relief valve 18 so as to reduce brake pressure to a level inversely proportional to the level of the torque control signals, overriding the pilot's commands to the extent necessary to do so.

FIG. 3 includes preferred gain constants and transfer functions for the various components of the circuit. It will be recognized that the actual values of the various constants may differ from one airplane to another, and, in fact, from one braked wheel to another. The particular gain constants presented in FIG. 3 represent preferred values for a brake torque control system developed for application to the braking system of a Boeing 747 airplane.

Figure 4A:
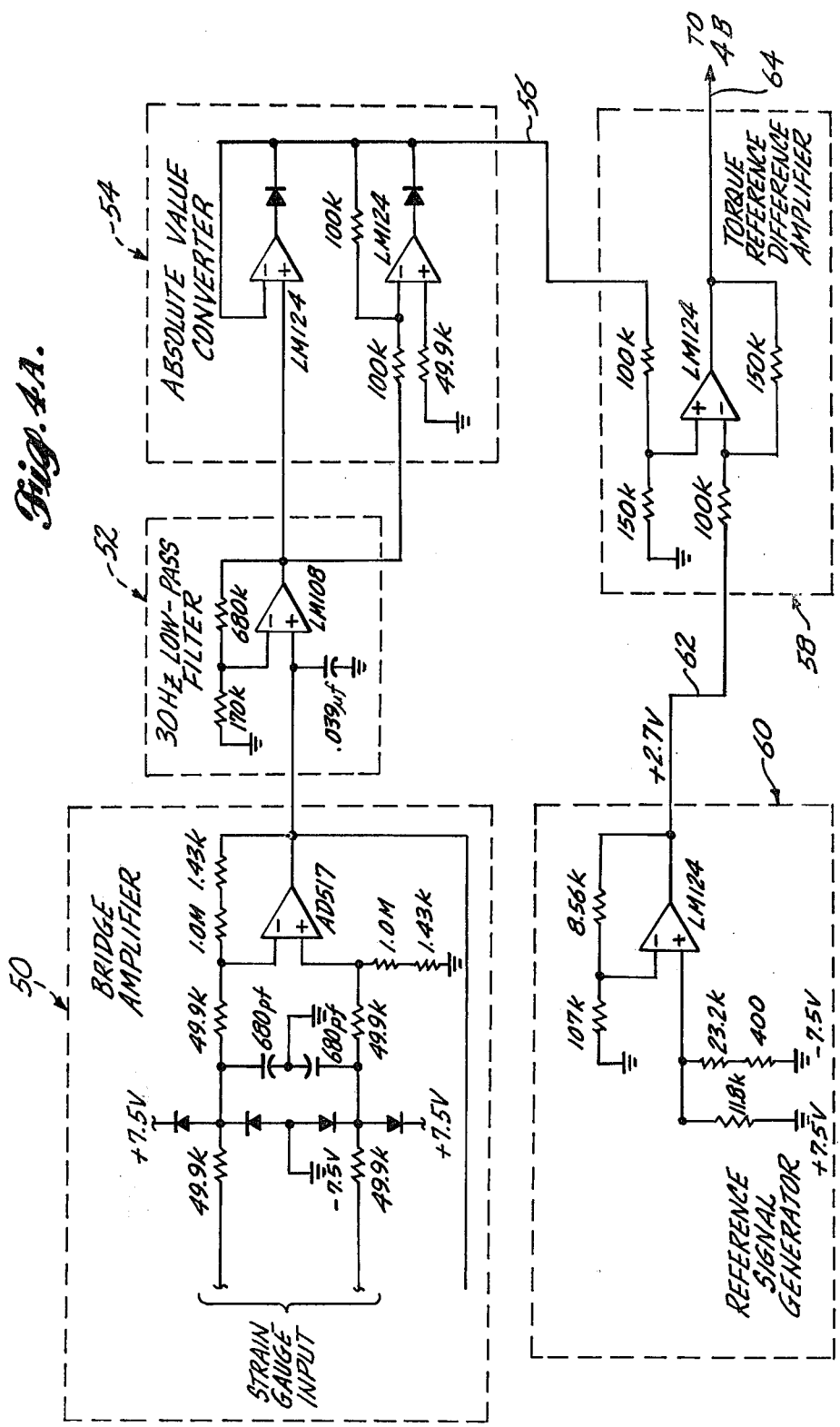

The schematic electrical circuit of FIGS. 4A and 4B represents an example of an electrical circuit implementing the functions of the brake torque control circuit set forth in FIG. 3 and described above. The values and identities of the various electrical components indicated in FIGS. 4A and 4B are representative of one operative embodiment of the circuit indicated in FIG. 3.

The torque control circuit 24 has a transfer function represented by $$\frac{K_{I1}}{s + K_{I2}} + K_P + \frac{K_{D1}K_{D2}s}{s + K_{D3}K_{D2}},$$

where s represents the LaPlacian operator, $K_{11}$ and $K_{12}$ represent gain constants for the integrator 66, $K_P$ represents the gain constant for the proportional gain amplifier 68, and $K_{D1}$, $K_{D2}$, and $K_{D3}$ represent gain constants for the differentiator 70. The values of $K_P$, $K_{12}$, $K_{D1}$, $K_{D2}$ and $K_{D3}$ are preferbly constants for example, respectively, whereas the value of $K_{11}$ is preferably dependent on the polarity of the error signal. For example, in the preferred embodiment of the torque control circuit 24 the value of $K_{11}$ is 1.0 for a positive error signal and 0.2 for a negative error signal. It is found that this weighting of the integrator gain constant in favor of positive error signals (which represent excessive torque) results in more efficient torque control and prevention of torque overshooting in the case of hard braking, without the integrator output rapidly declining in response to negative error signals as would occur if the integrator gain constant were the same for both positive and negative error signals.

To determine the optimum values for the gain constants in the transfer function given above for the torque control circuit 24, a root locus analysis was conducted. In this analysis, actual empirically determined transfer functions for the brakes the hydraulic system of a Boeing 747 airplane were combined with the transfer function given above for the torque limiting circuit. The relationship between brake torque and brake pressure was approximated as an exponential function wherein brake torque is proportional to the brake pressure raised to the 0.7 power. It is believed that the general characteristics of the transfer functions for commercial transport airplanes are sufficiently similar that the conclusions drawn on the basis of the root locus analysis for the Boeing 747 landing wheel assembly are of general applicability to other large airplane systems, although the actual gain constants will, of course, be different in each case.

It is found on the basis of the root locus analysis that it is preferable that the proportional gain amplifier 18 have a negative gain constant, as opposed to the positive gain constants of the integrator 66 and the differentiator 70. With a negative proportional gain the system response is found to be damped more effectively than with either a positive or a zero proportional gain. More specifically, a negative proportional gain is found to shift the root loci of the system toward greater stability and thereby improve the stability of the system response.

It is found that all three of the integrator, differentiator, and proportional gain circuits are necessary to provide a satisfactory torque control system. Tests have indicated that only the differentiator, which produces a lead signal, is effective to suppress torque overshoot resulting from sudden brake application.

The integrator is found to be essential for providing a constant output signal in response, for example, to a sustained hard application of the brakes by the pilot. In this regard, the integrator operates to maintain the brake pressure relief valve opened to a level whereby a steady state condition is maintained, with the brake torque held constant at the level of the maximum limit value. That is, the integrator operates to hold the brake torque at the maximum level in response to a sustained application of the brakes to any manual pressure above that which would otherwise give rise to an excessive torque condition. Neither the differentiator nor the proportional gain amplifier provide this function. Integral and proportional gain circuits, either alone or combined, fail to maintain initial torque overshoot to within acceptable levels, generally considered to be under 25 percent. Purely proportional gain systems are unstable at the gains required to generate sufficient torque control. Integral and proportional-integral systems are stable but, as already mentioned, fail to suppress torque overshoot.

Although the braking system of the present invention is described and illustrated by reference to a preferred embodiment, it will be understood that variations, alterations, and modifications that may be apparent to one of ordinary skill in the art may be made without departing from the scope of the invention. Accordingly, the scope of the present invention is defined only by the following claims.

The embodiments of the invention in which an exclusive property or privilege is claimed are defined as follows:

1. A brake torque control system for limiting torque developed during braking of a braked wheel, comprising:
   transducer means responsive to brake torque to provide a brake torque signal representative of the magnitude of the torque developed at the braked wheel;
   means for providing a reference torque signal representative of a predetermined maximum brake torque;
   means for comparing said brake torque signal with said reference torque signal to provide an error signal representative of the difference between said brake torque and said predetermined maximum brake torque;
   a torque limiting circuit including an integrator, proportional gain means, and a differentiator, said integrator operating to integrate said error signal to provide an output signal representative at the integral of said error signal, said proportional gain means operating in response to an error signal having a polarity representative of a brake torque greater than said predetermined maximum brake torque to provide an output signal substantially proportional to said error signal, said differentiator operating to provide an output signal representative of the derivative of said error signal;
   summing means for additively combining said output signals of said integrator, said proportional gain means, and said differentiator to provide a brake torque control signal; and
   means responsive to said brake torque control signal for reducing brake force in response to said brake torque control signal.

2. The brake torque control system defined in claim 1 wherein said integrator and said differentiator have gain constants of a polarity opposite that of said proportional gain means and wherein the means responsive to said brake torque control signal operates to reduce brake force in inverse proportion to the level of said brake torque control signal.

3. The brake torque control system defined in claims 1 or 2 wherein said integrator has a first gain constant when said error signal is of a polarity representing brake torque greater than said predetermined maximum torque and a second gain constant when said error signal is of a polarity representing brake torque less than said predetermined maximum torque, said first gain constant being substantially greater than said second gain constant.

4. The brake torque control system defined in claim 3 wherein said means responsive to said brake torque control signal for reducing brake force is a brake pressure relief valve.

5. In a braking system for an airplane wherein an antiskid system responsive to wheel speed operates to provide an antiskid control signal to a brake pressure relief valve to reduce brake pressure in a braked wheel in response to a skid condition, a brake torque control system comprising:
   transducer means responsive to brake torque to provide a brake torque signal representative of the magnitude of the torque developed at the braked wheel;

means for providing a reference torque signal representative of a predetermined maximum brake torque;

means for comparing said brake torque signal with said reference torque signal to provide an error signal representative of the difference between said brake torque and said predetermined maximum brake torque;

a torque limiting circuit including an integrator, a proportional gain means, and a differentiator, said integrator operating to integrate said error signal to provide an output signal representative of the integral of said error signal, said proportional gain means operating in response to an error signal having a polarity representative of a brake torque greater than said predetermined maximum brake torque to provide an output signal substantially proportional to said error signal, said differentiator operating to provide a derivative signal representative of the derivative of said error signal;

summing means for additively combining the output signals of said integrator, said proportional gain means, and said differentiator to provide a brake torque control signal; and signal selector means interposed electrically between said antiskid system and said brake pressure relief valve, said signal selector being responsive to said antiskid control signal and to said brake torque control signal to transmit the larger of said antiskid and torque control signals to said brake pressure relief valve to reduce brake pressure.

6. The system defined in claim 5 further comprising means for comparing said antiskid control signal with said output signal of said integrator of said torque limiting circuit and providing a signal representative of the difference between said antiskid control signal and said output signal of said integrator as feedback input to said integrator such that said integrator tracks said antiskid output signal while the antiskid system is responsive to a skid condition.

7. The system defined in claim 5 wherein said integrator and said differentiator have gain constants of a polarity opposite that of said proportional gain means.

8. The system defined in claims 5, 6, or 7 wherein said integrator has a first gain constant when said error signal is of a polarity representing brake torque greater than said predetermined maximum torque and a second gain constant when said error signal is of a polarity representing brake torque less than said predetermined maximum torque, said first gain constant being substantially greater than said second gain constant.

9. An antiskid and torque control system for controlling brake force applied by a hydraulic brake to a braked wheel of an airplane, comprising:

a brake pressure relief valve operably connected to said hydraulic brake for reducing brake pressure and thereby reducing the brake force applied by said brake;

an antiskid system responsive to wheel speed for providing an antiskid control signal in response to a skid condition;

transducer means responsive to brake torque to provide a brake torque signal representative of the magnitude of the torque developed at the braked wheel;

means for providing a reference torque signal representative of a predetermined maximum brake torque;

means for comparing said brake torque signal with said reference torque signal to provide an error signal representative of the difference between said brake torque and said predetermined maximum brake torque;

a torque limiting circuit including an integrator, proportional gain means, and a differentiator, said integrator operating to integrate said error signal to provide an output signal representative of the integral of said error signal, said proportional gain means operating in response to an error signal having a polarity representative of a brake torque greater than said predetermined maximum brake torque to provide an output signal substantially proportional to said error signal, said differentiator operating to provide an output signal representative of the derivative of said error signal;

summing means for additively combining the output signals of said integrator, said differentiator and said proportional gain means to provide a brake torque control signal;

means for applying said antiskid control signal and said brake torque control signal to said brake pressure relief valve.

10. The antiskid and torque control system defined in claim 9 wherein said means for applying said antiskid control signal and said brake torque control signal to said brake pressure relief valve comprises a signal selector interposed electrically between said antiskid system and torque limiting circuit and said brake pressure relief valve, said signal selector operating to transmit the larger of said antiskid control and brake torque control signals to said brake pressure relief valve.

11. The antiskid and torque control system defined in claim 9 or 10 wherein said integrator and said differentiator have gain constants of a polarity opposite that of said proportional gain means.

12. The antiskid and torque control system defined in claim 11 wherein said integrator has a first gain constant when said error signal is of a polarity representing brake torque greater than said predetermined maximum torque and a second gain constant when said error signal is of a polarity representing brake torque less than said predetermined maximum torque, said first gain constant being substantially greater than said second gain constant.

13. The antiskid and torque control system defined in claim 12 further comprising means for comparing said antiskid control signal with said output signal of said integrator of said torque limiting circuit and providing a signal representative of the difference between said antiskid control signal and said output signal of said integrator as feedback input to said integrator such that said integrator tracks said antiskid output signal.

14. The antiskid and torque control system defined in claim 9 or 10 wherein said integrator has a first gain constant when said error signal is of a polarity representing brake torque greater than said predetermined maximum torque and a second gain constant when said error signal is of a polarity representing brake torque less than said predetermined maximum torque, said first gain constant being substantially greater than said second gain constant.

15. The antiskid and torque control system defined in claim 9 or 10 further comprising means for comparing said antiskid control signal with said output signal of said integrator of said torque limiting circuit and providing a signal representative of the difference between said antiskid control signal and said output signal of said integrator as feedback input to said integrator such that said integrator tracks said antiskid output signal.

* * * * *

UNITED STATES PATENT AND TRADEMARK OFFICE
CERTIFICATE OF CORRECTION

PATENT NO. : 4,412,291

DATED : October 25, 1983

INVENTOR(S) : Robert L. Amberg et al.

It is certified that error appears in the above-identified patent and that said Letters Patent is hereby corrected as shown below:

| | |
|---|---|
| Column 2, line 29: | "knonw" should be --known-- |
| line 65: | "devic" should be --device-- |
| Column 5, line 11: | "over compensation" should be --overcompensation-- |
| Column 6, line 45: | "and" should be --an-- |
| Column 7, line 21: | insert --brake-- before "torque" |
| line 24: | "forthe" should be --forth-- |
| Column 8, line 57: | "preferbly" should be --preferably-- |
| Column 9, line 7: | insert --and-- after "brakes" |
| ABSTRACT, line 13: | "preventskidding" should be --prevent skidding-- |
| ABSTRACT, line 16: | "integratorof" should be --integrator of-- |
| ABSTRACT, line 18: | "are" should be -- the --. |

Signed and Sealed this

Third Day of July 1984

[SEAL]

Attest:

GERALD J. MOSSINGHOFF

Attesting Officer     Commissioner of Patents and Trademarks